United States Patent [19]
Pike

[11] Patent Number: 4,961,971
[45] Date of Patent: Oct. 9, 1990

[54] METHOD OF MAKING OXIDATIVELY STABLE WATER SOLUBLE AMORPHOUS HYDRATED METAL OXIDE SIZED FIBERS

[75] Inventor: Roscoe A. Pike, Granby, Conn.

[73] Assignee: United Technologies Corporation, Hartford, Conn.

[21] Appl. No.: 285,922

[22] Filed: Dec. 19, 1988

[51] Int. Cl.⁵ .............................................. B05D 3/02
[52] U.S. Cl. .................................. 427/376.2; 427/377
[58] Field of Search ................ 427/226, 376.2, 376.4, 427/377; 423/608, 626, 325

[56] References Cited

U.S. PATENT DOCUMENTS

| | | | |
|---|---|---|---|
| 2,820,693 | 1/1958 | Hervert et al. | 423/626 |
| 2,943,955 | 7/1960 | Brill | 427/376.2 |
| 2,984,628 | 5/1961 | Alexander et al. | 252/313.1 |
| 3,002,854 | 10/1961 | Brill | 427/376.2 |
| 3,017,282 | 1/1962 | Brill | 106/287.19 |
| 3,547,670 | 12/1970 | Fuchs et al. | 427/376.2 |
| 3,657,003 | 4/1972 | Kenney | 427/376.2 |
| 3,861,978 | 1/1975 | Cannole et al. | 156/308.2 |
| 3,989,876 | 11/1976 | Moji et al. | 428/472 |
| 4,010,247 | 3/1977 | Wassermann et al. | 423/626 |
| 4,376,803 | 3/1983 | Katzman | 427/226 |
| 4,584,108 | 4/1986 | Block | 423/626 |
| 4,623,591 | 11/1986 | Pike | 428/414 |
| 4,678,820 | 7/1987 | Pike | 523/200 |
| 4,814,202 | 3/1989 | Castelas | 427/226 |

FOREIGN PATENT DOCUMENTS

| | | | |
|---|---|---|---|
| 60-75671 | 4/1985 | Japan | 427/226 |
| 654049 | 6/1951 | United Kingdom | 427/387 |

OTHER PUBLICATIONS

Arthur W. Thomas, "The Nature of 'Aluminum Oxide' Hydrosols", The Journal of the American Chemical Society, Mar. 5, 1932, pp. 841–855.

Primary Examiner—Sadie Childs

[57] ABSTRACT

A method of making a polymeric composite wherein the polymeric composite is more oxidatively stable. The method comprises reacting aluminum, titanium, silicon, or zirconium with HBr or HI$_2$, oxidizing the reaction product to form a hydrosol and applying the hydrosol to the fiber surface prior to incorporation in a polymeric composite. The composite exhibits greater oxidative stability as it is exposed to temperatures of about 100° C. to about 900° C.

8 Claims, 1 Drawing Sheet

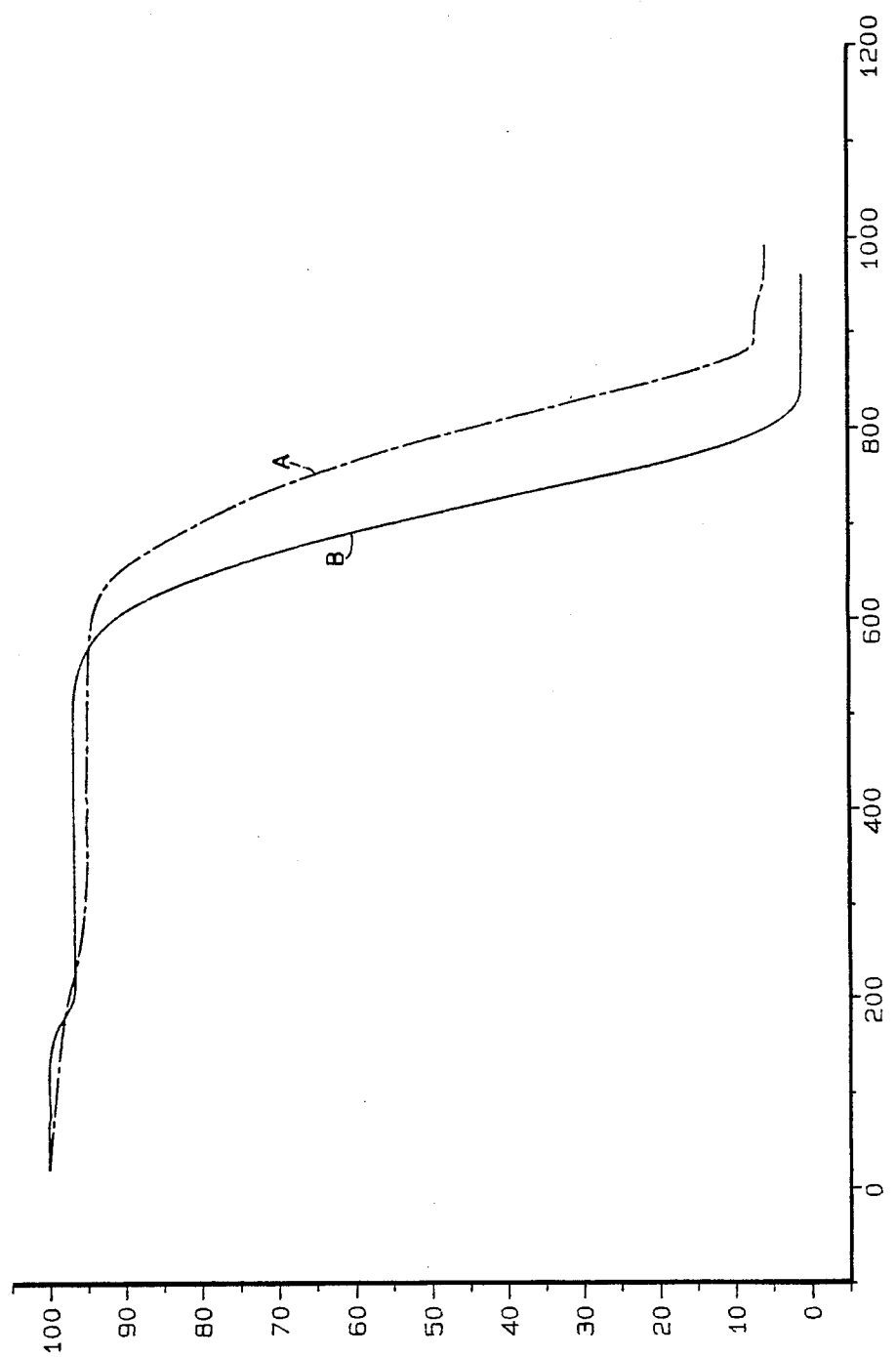

METHOD OF MAKING OXIDATIVELY STABLE WATER SOLUBLE AMORPHOUS HYDRATED METAL OXIDE SIZED FIBERS

TECHNICAL FIELD

The field of art to which this invention pertains is methods for using composites.

BACKGROUND ART

Weight saving and manufacturing cost benefits have led to the increase in use of organic matrix fiber reinforced composite structures in the aircraft and aerospace industries. In order to be a viable alternative to metal these composites should maintain the strength typical of conventional structural systems. In many applications composites are put under a variety of environmental and mechanical stresses. For example, frequently these composites are exposed over long periods of time to elevated temperatures which can result in a loss of composite properties. The loss of properties can result from heat induced microcracks that allow oxygen to attack the fibers. As a result of this deficiency, extensive research and development efforts have been undertaken to define methods and identify materials which improve composite performance in elevated temperatures. For example, it is known that surface preparation of fibers can be important in the formation of composites. Thus, the fiber can be coated with an organic primer or sizing agent to produce a surface which when combined with the matrix resin develops the strengths which meet application requirements. A variety of sizing agents have been used to produce improved bondability including epoxy, polyimide and polyvinylacetate polymers. In particular, commonly assigned U.S. Pat. No. 4,678,820 describes an amorphous hydrated metal oxide primer as a fiber size that provides improved wet strength to a fabricated composite. Although the above surface preparations have provided advantages, there is a need for new technology to aid in the advancement of lightweight aerospace-type composite structures.

Accordingly, there is a constant search in this field of art for new methods of providing lightweight, structurally sound composites.

DISCLOSURE OF INVENTION

The invention is directed to a method of making a polymeric composite wherein the polymeric composite is more oxidatively stable. The method comprises reacting aluminum, titanium, silicon, or zirconium with HBr or HI, oxidizing the reaction product to form a hydrosol and applying the hydrosol to the fiber surface prior to incorporation in a polymeric composite.

Another aspect of this invention is the use of the above-described composite where it exhibits greater oxidative stability as it is exposed to temperatures of about 100° C. to about 900° C.

The water soluble amorphous hydrated metal oxide sizing for composite fibers provides improved oxidation resistance at elevated temperatures. Thus, this invention makes a significant advance to the aerospace industry by providing new technology relating to structural composites.

The foregoing, and other features and advantages of the present invention will become more apparent from the following description, claims and accompanying drawings.

BRIEF DESCRIPTION OF THE DRAWINGS

The Figure graphically depicts the oxidation resistance of unsized graphite fiber and fibers having the sizing of this invention.

BEST MODE FOR CARRYING OUT THE INVENTION

Aluminum is preferred as the metal for the water soluble amorphous hydrated metal oxide sizing of this invention. However it is believed that Ti, Si, Fe, Zr and other hydrosol forming metals or combinations thereof may also be used.

Any acid HX may be used that results in a metal salt which undergoes oxidation to produce a metal-OH bond. Typically, X may be Br or I. Cl is not preferred since the chloride is not oxidized during the oxidation step described below.

Typically, any oxidizing agent can be used that is water soluble. Exemplary oxidizing agents are $H_2O_2$, $O_3$, organohydroperoxides (e.g. t-butyl hydro peroxide) and ozonides.

Typically, the amorphous hydrated metal oxide sizing of this invention are made by reacting the metal with an acid. It is preferred to use less than an equivalent amount of acid because it is believed this aids in the solubilization of the resulting hydrosol. Then a method is used to increase the metal to anion ratio of the above product. The lowest amount of anion that maintains the hydrosol is preferred since excess halide may lead to corrosion. A preferred method of increasing the metal to anion ratio is the oxidation of the above reaction product. Dialysis (e.g. aqueous dialysis through a semipermeable membrane) can also be used to increase the metal to halide ratio and will increase the ratio above what can be achieved with oxidation. The reaction is empirically illustrated using aluminum as

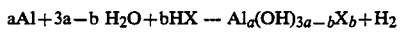

$$aAl + 3a-b\ H_2O + bHX \rightarrow Al_a(OH)_{3a-b}X_b + H_2$$

These water soluble inorganic primer compositions comprise colloidal aqueous solutions of hydrated alumina (aluminum oxide hydrosols) stabilized by small amounts of halide. Typically, the ratio of a to b in the above formula is about 5/1 to about 800/1. It is preferred that a ratio for a to b of from about 8 to 1 to about 500/1 is used for sizing fibers with the water soluble inorganic sizing because the least amount of anion to maintain the hydrosol is desirable because excess halide may lead to composite matrix decomposition. Ratios of a to b higher than about 30 to 1 may be achieved by dialysis of the solution after oxidation. The aqueous solutions of hydrated metal oxides are then applied and typically dried, for example, at about 50° C. to about 250° C. for about 15 minutes. It is believed as the water evaporates from the primer further condensation occurs to produce a polymeric film of greater molecular weight.

The thickness of this size layer can vary effectively from about 1.5 nm to about 1000 nm. Preferably, the thickness is about 2.5 nm to about 1000 nm. Above about 1000 nm, the layer can be so thick as to create stress risers and to form a weak boundary layer. Below about 1.5 nm, the layer does not provide the properties such as crack propagation resistance at the levels typically required. In addition, it is preferable to apply the sizing to the fiber surface with a plurality of layers as this facilitates removal of volatiles (e.g. water) which can be more difficult to achieve from a single thick application.

Any fiber may be used in the practice of this invention that is useful for making composite articles. Examples include amide, carbon, metal, boron, glass, silicon carbide, alumina and KEVLAR TM fibers (Dupont DeNemours, E. I., Co., Wilmington, Del.). Preferably graphite or glass fibers are used as these provide the properties most desired of composites such as strength and light weight. Any conventional resin matrix can be used for the practice of this invention that is useful for making composite articles. Preferably epoxides or polyimide resins are used as these provide the properties most desired such as good strength. It is especially preferred to use 3501-6 TM resin available from Hercules, Inc. (Wilmington, Del.) 5208 resin available from Narmco, Avimide N TM resin (DuPont DeNemours, Wilmington, Del.) and LARC-TPI resin (Nasa) as they resist environmental stresses, are strong and are commercially readily available.

Any method of making a composite may be used for the practice of this invention that provides composites having reinforcing amorphous hydrated metal oxide coated fibers. For example, a chopped fiber composite can be made by mixing chopped fibers coated with amorphous hydrated metal oxide and resin in a mold under pressure and optional heat. However, it is preferred to apply a coating of metal alkoxide to the carbon fibers by drawing the fiber through a solution of metal alkoxide. The metal alkoxide coated composite fibers are then maintained at a temperature of about 25° C. to about 300° C. as below 25° C. the reaction kinetics are typically too slow and above 400° C. loss of desirable fiber properties or crystallization of the coating may occur with an accompanying loss of mechanical strength. It is especially preferred to heat the aluminum alkoxide coated fibers to a temperature of about 100° C. to about 200° C. as the lower temperatures minimize the risk of mechanical property degradation of fibers and morphological transformation of the coatings leading to shrinkage and embrittlement. Surprisingly, an increase in temperature from room temperature (R.T.) to about 325° C. does not affect an increase in metal alkoxide conversion to amorphous hydrated metal oxide.

It is also preferred, particularly with graphite fibers, to use a low surface tension water solution to insure good wetting and spreading of the size on the fiber surface. It is especially preferred to use a water solution that has a surface tension below about 40 dynes/cm. This can be achieved, for example, by the addition to the hydrosol of sufficient amounts of a surfactant such as NP-14 TM surfactant (Union Carbide) or FSN TM surfactant (E. I. DuPont DeNemours).

Once coated with amorphous hydrated metal oxide, the reinforcing carbon fibers (tows) are dipped into the resin solution to form a tape prior to the molding step. Typically, the resin impregnated fibers are allowed to dry so that any solvent will evaporate. The graphite tape can then be cut into plies (layers of impregnated fibers) of the desired dimensions of the article to be fabricated. The plies are then stacked to create the desired thickness, typically in metal molds coated with mold release agent such as Micro Spray (Micro-Spray Products Inc.). The assembled ply layup is then placed in a press and exposed to pressures and temperatures conventional for the resin system used and application desired.

EXAMPLE 1

In a 250 cc round bottom flask equipped with a magnetic stirrer, air condenser, dropping funnel, and nitrogen inlet tube was mixed 6.75g (0.25 mole) of $-170$ to $+300$ mesh aluminum powder with 37 g of 47% hydriodic acid (0.14 mole) diluted with 40 cc of distilled water. The mixture was heated for six hours to dissolve the aluminum powder. The colorless solution was heated to 75°-80° C. with nitrogen purging the solution, and reacted with 28g of 30% hydrogen peroxide diluted with 40 cc of distilled water added dropwise over a period of six hours. During the course of oxidation, iodine crystals collected in the air condenser. Nitrogen was bubbled through the solution after cooling for a period of sixteen hours to give a light straw yellow viscous solution. The solution was warmed to 50° C. and an additional 40 cc of distilled water was added. The solution contained some sediment which was removed by centrifuging. The resulting solution contained 9.5% solids and gave a Al/I mole ratio of 9.5/1. A portion of that solution was diluted to 2 wt. %. Unsized, surface treated, Celion G30-500 graphite fiber (BASF Corp.) was drawn through the 2 wt. % solution of hydrated aluminum oxide. The resulting coated fibers were heated at 200° C. in an air oven to dry and thus produce the amorphous alumina coating.

The coated fibers (and uncoated fibers as controls) were tested for high temperature oxidation resistance using thermogravimetric analysis (TGA). The results are depicted in the Figure. In the Figure, percent weight loss (Y) is graphed against temperature in degrees centigrade (X). There is a significant difference in the thermal oxidative stability as shown by curve (A) (treated graphite) in comparison to curve (B) (untreated graphite).

This size may be used to advantage in a wide range of composites. For example, chopped fiber, filament wound and ordered fiber composites benefit from this primer. While this invention has been described in terms of a metal alkoxide, a mixture of various metal alkoxides can be used.

This sizing coating provides improved oxidation resistance at elevated temperatures. At temperatures of about 100° C. to about 900° C., this sizing results in more oxidatively stable fibers and hence composites. The resulting properties such as tensile and flexural strengths of composites made with the inorganic fiber sizing are believed at least equivalent or better than composites made using conventional organic fiber sizing. Yet the inorganic sizing agent can be utilized at thinner layers than the 1.0 wt. % loading of layers typical of organic sizing. Thicker layers tend to set up stress risers and to form a weak boundary layer as the components segregate. Also, because of its oxidation resistance the inorganic sizing can be used equally as well with high temperature resins such as polyimides or with low temperature resins such as epoxy systems unlike organic sizing agents which are typically temperature specific.

It is also believed that composites using the inorganic sized fibers will have improved wet strength retention, be less subject to microcracking and exhibit improved fracture toughness and impact strength properties. Also, the inorganic insulating sheath will have little, if any, deleterious effect on electrical equipment (e.g., cause shorting) should such a composite disintegrate.

This invention provides an amorphous hydrated metal oxide sizing for fiber reinforced composites resulting in improved oxidation resistance. Thus, it makes a significant advance in the aerospace industry by providing new technology relating to composites.

It should be understood that the invention is not limited to the particular embodiments shown and described herein, but that various changes and modifications may be made without departing from the spirit and scope of this novel concept as defined by the following claims.

I claim:

1. A method of making a fiber reinforced polymeric matrix composite material wherein the fiber reinforcement has a layer thereon formed by
   (a) reacting aluminum, titanium, silicon, or zirconium with HBr or HI;
   (b) oxidizing the reaction product with a water soluble oxidizing agent to form a hydrosol and reduce the anion concentration; and
   (c) applying said hydrosol to said fiber surface.

2. The method as recited in claim 1 wherein the reacting metal is selected from the group consisting of titanrum, aluminum, and silicon and the fiber is selected from the group consisting of graphite, glass, silicon carbide, alumina, boron and polyaramid.

3. The method as recited in claim 1 wherein the fiber is graphite and the reacting metal is aluminum.

4. The method as recited in claim wherein said oxidized reaction product is dialyzed.

5. A method of using a fiber reinforced polymeric matrix composite material wherein the fiber reinforcement has a layer thereon by exposing the composite to temperatures of about 100° C. to about 900° C. wherein the improvement comprises forming said layer by:
   (a) reacting aluminum titanium, silicon or zirconium with HBr or HI;
   (b) oxidizing the reaction product with a water soluble oxidizing agent to form a hydrosol; and
   (c) applying said hydrosol to said fiber surface;
wherein the composite has greater oxidative stability.

6. The method as recited in claim 5 wherein the reacting metal is selected from the group consisting of titanium, aluminum, and silicon and the fiber is selected from the group consisting of graphite, glass, silicon carbide, alumina, boron and polyaramid.

7. The method as recited in claim 5 wherein the fiber is graphite and the reacting metal is aluminum.

8. The method as recited in claim 1 wherein the composite is exposed to temperatures of about 500° C. to about 900° C.

* * * * *

UNITED STATES PATENT AND TRADEMARK OFFICE
CERTIFICATE OF CORRECTION

PATENT NO. : 4,961,971

DATED : October 9, 1990

INVENTOR(S) : Roscoe A. Pike

It is certified that error appears in the above-identified patent and that said Letters Patent is hereby corrected as shown below:

Column 6, Claim 4, line 3, after "claim" insert --1--.

Signed and Sealed this

Fourteenth Day of January, 1992

Attest:

HARRY F. MANBECK, JR.

*Attesting Officer*  *Commissioner of Patents and Trademarks*